US012091557B2

(12) United States Patent
Book et al.

(10) Patent No.: US 12,091,557 B2
(45) Date of Patent: Sep. 17, 2024

(54) PIGMENT INCLUDING A COATING OF NANOPARTICLES

(71) Applicant: VIAVI SOLUTIONS INC., San Jose, CA (US)

(72) Inventors: John Edward Book, Santa Rosa, CA (US); Alberto Argoitia, Santa Rosa, CA (US); Jaroslaw Zieba, Santa Rosa, CA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 951 days.

(21) Appl. No.: 16/808,158

(22) Filed: Mar. 3, 2020

(65) Prior Publication Data

US 2020/0283637 A1 Sep. 10, 2020

Related U.S. Application Data

(60) Provisional application No. 62/813,483, filed on Mar. 4, 2019.

(51) Int. Cl.
*C09C 3/10* (2006.01)
*C09C 3/06* (2006.01)

(52) U.S. Cl.
CPC .............. *C09C 3/10* (2013.01); *C09C 3/06* (2013.01); *C09C 2200/1004* (2013.01); *C09C 2200/102* (2013.01); *C09C 2200/1054* (2013.01); *C09C 2200/301* (2013.01); *C09C 2200/308* (2013.01)

(58) Field of Classification Search
CPC ............ C09C 1/0015; C09C 3/06; C09C 3/10
See application file for complete search history.

(56) References Cited

U.S. PATENT DOCUMENTS

| | | | |
|---|---|---|---|
| 6,596,070 B1 * | 7/2003 | Schmidt | ................ C09C 1/0024 428/404 |
| 8,172,934 B2 | 5/2012 | Hashizume | |
| 2002/0192448 A1 | 12/2002 | Schoen et al. | |
| 2003/0060538 A1 | 3/2003 | Norris et al. | |
| 2003/0177949 A1 | 9/2003 | Phillips et al. | |
| 2003/0215641 A1 | 11/2003 | Phillips et al. | |
| 2004/0124398 A1 | 7/2004 | Kuntz et al. | |
| 2005/0019575 A1 * | 1/2005 | Jungnitz | ............... C09C 1/0078 428/407 |
| 2007/0126694 A1 | 6/2007 | Moriyama et al. | |
| 2008/0070153 A1 | 3/2008 | Ioku | |
| 2008/0128286 A1 | 6/2008 | Wu | |
| 2008/0292820 A1 | 11/2008 | Padiyath et al. | |
| 2008/0318012 A1 | 12/2008 | Domnick et al. | |
| 2010/0180796 A1 | 7/2010 | Kitamura et al. | |
| 2010/0297045 A1 | 11/2010 | Kaupp | |
| 2011/0223218 A1 | 9/2011 | Jones | |
| 2012/0050386 A1 * | 3/2012 | Shimizu | ............... C09D 11/324 524/556 |
| 2013/0116106 A1 | 5/2013 | Servin et al. | |
| 2013/0200415 A1 | 8/2013 | Evans et al. | |
| 2013/0221837 A1 | 8/2013 | De Brouwer et al. | |
| 2015/0116856 A1 | 4/2015 | Lee et al. | |
| 2016/0002432 A1 * | 1/2016 | Vo | ........................... C09C 1/642 106/446 |
| 2016/0061417 A1 | 3/2016 | Kim et al. | |
| 2017/0328539 A1 | 11/2017 | Huang | |
| 2017/0369709 A1 | 12/2017 | Seydel et al. | |
| 2018/0073159 A1 | 3/2018 | Curran et al. | |
| 2018/0084658 A1 | 3/2018 | Curran et al. | |
| 2018/0239070 A1 | 8/2018 | England et al. | |
| 2019/0006541 A1 | 1/2019 | So et al. | |
| 2019/0182996 A1 | 6/2019 | Kelkar et al. | |
| 2020/0284947 A1 | 9/2020 | Argoitia et al. | |
| 2021/0231849 A1 | 7/2021 | Argoitia et al. | |

FOREIGN PATENT DOCUMENTS

| | | | |
|---|---|---|---|
| BR | 102012017356 | 3/2014 | |
| CN | 1267686 A | 9/2000 | |
| CN | 1459034 A | 11/2003 | |
| CN | 1542059 A | 11/2004 | |
| CN | 1756805 | 4/2006 | |
| CN | 101120059 | 2/2008 | |
| CN | 102504620 A | 6/2012 | |
| CN | 103804963 A | 5/2014 | |
| CN | 104205376 A | 12/2014 | |
| CN | 105682451 A | 6/2016 | |
| CN | 106526962 A | 3/2017 | |
| CN | 108219541 | 6/2018 | |
| CN | 110337468 A | 10/2019 | |
| DE | 102008060228 | 6/2010 | |
| EP | 0 861 299 * | 4/2000 | ............... C09C 1/36 |
| EP | 1254928 | 11/2002 | |

(Continued)

OTHER PUBLICATIONS

Yan Yan et al., "Assembly of Layer-by-Layer Particles and Their Interactions with Biological Systems", ACS Publications, Aug. 22, 2013, 9 pages.
R.K. Iler "Multilayers of Colloidal Particles", Journal of Colloid and Interface Science 21, year 1966, pp. 569-594.
Marc MichelL et al., "Review article: Deposition Mechanisms in Layer-by-Layer or Step-by-Step Deposition Methods: From Elastic and Impermeable Films to Soft Membranes with Ion Exchange Properties", ISRN Materials Science, vol. 2012, Article ID 701695, 13 pages.
Science Direct Topics, "Perylene- an overview", Downloaded from the Internet on Nov. 29, 2023, 18 pages. (https://www.sciencedirect.com/topics/chemistry/perylene#:~:text=Perylene%201%20is%20a%20polycyclic,high% 2Dboiling%20mineral%20oil%20fractions.).
Wikipedia, "Perinone", downloaded from the Internet on Nov. 29, 2023, 2 pages.(https://en.wikipedia.org/wiki/Perinone).
Wikipedia, "Quinacridone", downloaded from the Internet on Nov. 29, 2023, 4 pages.(https://en.wikipedia.org/wiki/Quinacridone).

*Primary Examiner* — Pegah Parvini
(74) *Attorney, Agent, or Firm* — MANNAVA & KANG, P.C.

(57) ABSTRACT

A pigment including a pre-flake; and a coating of nanoparticles present on a surface of the pre-flake, wherein the nanoparticles can be present in the coating in an amount greater than about 40% by volume is disclosed. A method of making a pigment is also disclosed.

18 Claims, No Drawings

(56) References Cited

FOREIGN PATENT DOCUMENTS

| | | |
|---|---|---|
| EP | 2361953 | 8/2011 |
| ES | 2341940 | 6/2010 |
| JP | H04332766 | 11/1992 |
| JP | H07157689 A1 | 6/1995 |
| JP | H08199098 A1 | 8/1996 |
| JP | H0959532 A | 3/1997 |
| JP | 2001152049 A1 | 6/2001 |
| JP | 2006521463 A | 9/2006 |
| JP | 2006299051 | 11/2006 |
| JP | 2007518841 A1 | 4/2007 |
| JP | 2009511725 A1 | 3/2009 |
| JP | 2009221140 A1 | 10/2009 |
| JP | 2013518953 A | 5/2013 |
| JP | 2017149946 A | 8/2017 |
| KR | 20180066820 | 6/2018 |
| RU | 2015143539 A | 4/2017 |
| WO | 2004/050350 | 6/2004 |
| WO | 2007094253 A1 | 8/2007 |
| WO | 2015052319 | 4/2015 |
| WO | 2017041085 | 3/2017 |
| WO | 2018199182 A1 | 11/2018 |

* cited by examiner

PIGMENT INCLUDING A COATING OF NANOPARTICLES

RELATED APPLICATION

The present application claims the benefit of priority to U.S. Provisional Application No. 62/813,483, filed Mar. 4, 2019, the entire disclosure of which is hereby incorporated by reference.

FIELD OF THE INVENTION

The present disclosure generally relates to a pigment including a pre-flake; and a coating of colored nanoparticles present on a surface of the pre-flake, wherein the nanoparticle can be present in the coating in an amount greater than about 40% by volume. In an aspect, the pigment can include a pre-flake; and a coating of nanoparticles present on a surface of the pre-flake, wherein the nanoparticle can be present in the coating in an amount greater than about 65% by volume. A method of making the pigment is also disclosed.

BACKGROUND OF THE INVENTION

The manufacture of pigments, such as special effects pigments, generally requires complex vacuum processes, time-consuming step-wise coatings, and expensive post processing, such as stripping and grinding. The complexity in manufacturing pigments greatly limits production throughput and demands large amounts of investment in equipment and processes.

For example, in a special effect pigment with organic coatings, a reflector flake is covered by colored coatings on two opposite surfaces. As a result, stepwise processes are employed and a vacuum deposition of a metal reflector layer is required.

SUMMARY OF THE INVENTION

In an aspect, there is disclosed a pigment including a pre-flake; and a coating of colored nanoparticles present on a surface of the pre-flake, wherein the nanoparticles are present in the coating in an amount greater than about 40% by volume.

In another aspect, there is disclosed a pigment can include a pre-flake; and a coating of nanoparticles present on a surface of the pre-flake, wherein the nanoparticles are present in the coating in an amount greater than about 65% by volume.

In another aspect, there is discloses a method of making a pigment, including providing a pre-flake; providing a layer of a first charged nanoparticle to the pre-flake; rinsing; providing a layer of a second charged nanoparticle material to the pre-flake, wherein the second charged nanoparticle is oppositely charged from the first charged nanoparticle; and rinsing; wherein a coating of both of the first charged nanoparticles and the second charged nanoparticles is formed on a surface of the pre-flake, wherein the nanoparticles are present in the coating in an amount greater than about 40% by volume.

In a further aspect, there is disclosed a method of making a pigment, including providing a pre-flake; providing to the pre-flake alternating layers of a layer of charged polymer and a layer of first charged nanoparticle; rinsing; providing a layer of charged polymer or other molecules presenting interacting binding sites; rinsing; providing a layer of a second charged nanoparticle to the layer of the charged polymer or other molecules presenting interacting binding sites; and rinsing.

Additional features and advantages of various embodiments will be set forth, in part, in the description that follows, and will, in part, be apparent from the description, or can be learned by the practice of various embodiments. The objectives and other advantages of various embodiments will be realized and attained by means of the elements and combinations particularly pointed out in the description herein.

DETAILED DESCRIPTION OF THE INVENTION

It is to be understood that both the foregoing general description and the following detailed description are exemplary and explanatory only, and are intended to provide an explanation of various embodiments of the present teachings. In its broad and varied embodiments, disclosed herein are pigments, such as special effect pigments; and a method of manufacturing the pigment.

The pigment, such as a special effect pigment, can include a pre-flake; and a coating of nanoparticles, such as colored nanoparticles, present on a surface of the pre-flake, wherein the nanoparticle can be present in the coating in an amount greater than about 40% by volume, for example, greater than about 65% by volume. The pigment can be a lamellar pigment with a metal core and a color-rendering coating of self-assembled nanoparticle colorants. The pigment can be designed to meet specific visual or non-visual optical attributes. The method of making the disclosed pigments is cost effective and can provide a high throughput of higher performance special effect pigments, such as high chroma pigments.

The pigment can include a pre-fake as a core that is encapsulated with a coating of nanoparticles. The pre-flake can include a material chosen from reflective opaque materials, semi-transparent materials, and transparent materials depending upon the desired optical property of the resultant pigment.

The pre-flake can be a metal, non-metal, or metal alloy. In one example, the materials for the pre-flake can include any materials that have reflective characteristics in the desired spectral range. For example, any material with a reflectance ranging from 5% to 100% in the desired spectral range. An example of a reflective material can be aluminum, which has good reflectance characteristics, is inexpensive, and is easy to form into or deposit as a thin layer. Non-limiting examples of reflective opaque material for use in the pre-flake include aluminum, copper, silver, gold, platinum, palladium, nickel, cobalt, niobium, chromium, tin, iron, and combinations or alloys of these or other metals can be used as the pre-flake. In an aspect, the material for the pre-flake can be a white or light colored metal. In an example, the metal for the pre-flake can include a magnetic property. In other examples, the pre-flake can include, but is not limited to, the transition and lanthanide metals and combinations thereof; as well as metal carbides, metal oxides, metal nitrides, metal sulfides, metal borides, cermets, a combination thereof, or mixtures of metals and one or more of these materials. In an aspect, the pre-flake may include a transparent or semi-transparent material chosen from glass, silica, titania, alumina, natural mica, synthetic mica, and bismuth oxychloride. In another aspect, the pre-flake can include a metalloid material chosen from silicon, germanium, and molybdenum.

The pre-flake can be a non-metal, such as a polymer. The polymer can be a conjugated polymer. Conjugated polymers can be semi-conducting depending upon the processing conditions and predetermined optical effects for the pigment. The conjugated polymer can be used in selectively reflective pre-flakes. Various derivatives of conjugated polymers, such as poly-acetylene, poly-thiophens, and poly-phenylene vinylene, can be used as spectrally selective modulating reflectors. The conjugated polymers can be processed into nanoparticles and used as a colorant.

The thickness of the pre-flake can range from about 10 nm to about 3 microns, for example from about 30 nm to about 1 micron, and as a further example from about 40 nm to about 200 nm.

The pre-flake, for use in the disclosed pigment, can be any size or shape, such as lamellar, or an irregular shape. The average particle size of the pre-flake can range from about 3 microns to about 100 microns, for example from about 6 microns to about 75 microns, and as a further example from about 10 microns to about 50 microns. The pre-flake can be ball-milled flakes or ground-up thin film layers. In an aspect, the pre-flake can be microstructured or can include a grating to provide a diffractive effect.

The coating of nanoparticles that encapsulate the pre-flake can provide optical and functional features to the pigment. The optical features of the pigment can include at least one of: selective absorption of wavelengths within a defined spectral range, reflection of wavelengths within a defined spectral range, light scattering, and polarization control. Functional properties provided by the nanoparticles include, but are not limited to, electrical and/or magnetic properties, fluorescent properties, up-converting properties (for example, converting a near-infrared laser beam into a visible light or turning low-energy colors of light, such as red, into higher-energy colors, like blue or green), flame retardant, and electrostatic dissipation. In an aspect, the magnetic properties can allow for magnetic orientation of the nanoparticle when placed in a magnetic field. Each nanoparticle used in the coating can provide either the same or different optical and/or physical property to a pigment flake.

The coating of nanoparticles can be a single layer or multiple layers of nanoparticles. If the coating of nanoparticles is multiple layers, then the nanoparticles present in each layer can be the same or different, such as in terms of the presence of a colorant, the type of colorant, the thickness of the layer, the percent volume of nanoparticles in the layer, etc. In an aspect, the disclosed pigment can include a coating with multiple layers of nanoparticles.

The coating of nanoparticles can be present on at least one surface of the pre-flake. For example, the coating of nanoparticles can be present on greater than about 90% of the surface of the pre-flake, for example greater than about 95% of the pre-flake, and as a further example can be present on all surfaces (100% encapsulating) the pre-flake. In the event, that the encapsulation is not complete, then it is expected that the pre-flake may be open to the air and light sources without any intervening layers or layers having a colorant.

The coating, such as a single layer or multiple layers, of nanoparticles can have a thickness ranging from about 20 nm to about 2 microns, for example from about 60 nm to about 1.75 micron, and as a further example from about 75 nm to about 1.5 micron.

The nanoparticles can have an average particle size ranging from of less than about 700 nm, for example from about 2 nm to about 300 nm, for example from about 4 nm to about 100 nm, and as a further example from about 6 nm to about 90 nm. The average particle size can be optimized to achieve desired properties, such as flop, durability, and scatter, etc.

In an aspect, the nanoparticles can be chemically modified to provide electrostatic or acid-base interactions with other nanoparticles. As an example, a layer of a first charged nanoparticle can be applied to the pre-flake, and a layer of a second charged nanoparticle can be applied onto the layer of the first charged nanoparticle. The second charged nanoparticle can be oppositely charged from the first charged nanoparticle to provide the requisite interaction between the nanoparticles. In this manner, the coating can be formed with successive layers of nanoparticles, such as organic and/or inorganic nanoparticles each with different optical and functional properties.

The nanoparticles, for use in the coating, can include a colorant. The colorant can be at least one colored material, such as a pigment (insoluble), for example, inorganic or organic pigments; and dyes (soluble), such as an organic dye. As discussed above, each of the nanoparticles, such as the colorant, can be chemically modified, for example to provide a first charged nanoparticle and a second charged nanoparticle. In an aspect, the first charged nanoparticle can be the same or different from the second charged nanoparticle.

Non-limiting examples of colorants that can be used as nanoparticles, for example charged nanoparticles, include organic dyes chosen from perylene, perinone, quinacridone, quinacridonequinone, anthrapyrimidine, anthraquinone, anthanthrone, benzimidazolone, disazo condensation, azo, quinolones, xanthene, azomethine, quinophthalone, indanthrone, phthalocyanine, triarylcarbonium, dioxazine, aminoanthraquinone, isoindoline, diketopyrrolopyrrole, thioindigo, thiazineindigo, isoindoline, isoindolinone, pyranthrone, isoviolanthrone, miyoshi methane, triarylmethane, and mixtures thereof.

Additionally, non-limiting examples of colorants that can be used as nanoparticles, for example, charged nanoparticles, include pigments such as C.I. Pigment Red 123 (C.I. No. 71 145), C.I. Pigment Red 149 (C.I. No. 71 137), C.I. Pigment Red 178 (C.I. No. 71 155), C.I. Pigment Red 179 (C.I. No. 71 130), C.I. Pigment Red 190 (C.I. 71 140), C.I. Pigment Red 224 (C.I. No. 71 127), C.I. Pigment Violet 29 (C.I. No. 71 129), C.I. Pigment Orange 43 (C.I. No. 71 105), C.I. Pigment Red 194 (C.I. No. 71 100), C.I. Pigment Violet 19 (C.I. No. 73 900), C.I. Pigment Red 122 (C.I. No. 73 915), C.I. Pigment Red 192, C.I. Pigment Red 202 (C.I. No. 73 907), C.I. Pigment Red 207, C.I. Pigment Red 209 (C.I. No. 73 905), C.I. Pigment Red 206 (C.I. No. 73 900/73 920), C.I. Pigment Orange 48 (C.I. No. 73 900/73 920), C.I. Pigment Orange 49 (C.I. No. 73 900/73 920), C.I. Pigment Orange 42, C.I. Pigment Yellow 147, C.I. Pigment Red 168 (C.I. No. 59 300), C.I. Pigment Yellow 120 (C.I. No. 11 783), C.I. Pigment Yellow 151 (C.I. No. 13 980), C.I. Pigment Brown 25 (C.I. No. 12 510), C.I. Pigment Violet 32 (C.I. No. 12 517), C.I. Pigment Orange 64; C.I. Pigment Brown 23 (C.I. No. 20 060), C.I. Pigment Red 166 (C.I. No. 20 730), C.I. Pigment Red 170 (C.I. No. 12 475), C.I. Pigment Orange 38 (C.I. No. 12 367), C.I. Pigment Red 188 (C.I. No. 12 467), C.I. Pigment Red 187 (C.I. No. 12 486), C.I. Pigment Orange 34 (C.I. No. 21 115), C.I. Pigment Orange 13 (C.I. No. 21 110), C.I. Pigment Red 9 (C.I. No. 12 460), C.I. Pigment Red 2 (C.I. No. 12 310), C.I. Pigment Red 112 (C.I. No. 12 370), C.I. Pigment Red 7 (C.I. No. 12 420), C.I. Pigment Red 210 (C.I. No. 12 477), C.I. Pigment Red 12 (C.I. No. 12 385), C.I. Pigment Blue 60 (C.I. No. 69 800), C.I. Pigment Green 7 (C.I. No. 74 260), C.I. Pigment Green 36 (C.I. No. 74 265); C.I. Pigment Blue 15:1, 15:2, 15:3, 15:4, 15:6 and 15 (C.I. No. 74 160); C.I. Pigment Blue 56 (C.I. No. 42 800), C.I. Pigment Blue 61 (C.I. No. 42 765:1), C.I. Pigment Violet 23 (C.I. No. 51 319), C.I. Pigment Violet 37 (C.I. No. 51 345), C.I. Pigment Red 177 (C.I. No. 65 300), C.I. Pigment Red 254 (C.I. No. 56 110), C.I. Pigment Red 255 (C.I. No. 56 1050), C.I. Pigment Red 264, C.I. Pigment Red 270, C.I. Pigment Red 272 (C.I. No. 56 1150), C.I. Pigment Red 71, C.I. Pigment Orange 73, C.I. Pigment Red 88 (C.I. No. 73 312), C.I. Pigment Yellow 175 (C.I. No. 11 784), C.I. Pigment Yellow 154 (C.I. No. 11 781), C.I. Pigment Yellow 83 (C.I. No. 21 108), C.I. Pigment Yellow 180 (C.I. No. 21 290), C.I. Pigment Yellow 181 (C.I. No. 11 777), C.I. Pigment Yellow 74 (C.I. No. 11 741), C.I. Pigment Yellow 213, C.I. Pigment Orange 36 (C.I. No. 11 780), C.I. Pigment Orange 62 (C.I. No. 11 775), C.I. Pigment Orange 72, C.I. Pigment Red 48:2/3/4 (C.I. No. 15 865:2/3/4), C.I. Pigment Red 53:1 (C.I. No. 15 585:1), C.I. Pigment Red 208 (C.I. No. 12 514), C.I. Pigment Red 185 (C.I. No. 12 516), C.I. Pigment Red 247 (C.I. No. 15 915), Pigment Black 31 ($C_{40}H_{26}N_2O_4$), Pigment Orange 16 ($C_{32}H_{24}Cl_2N_8O_2$), and mixtures thereof.

Additionally, non-limiting examples of colorants that can be used as nanoparticles, for example, charged nanoparticles, include inorganic pigments such as carbon black, lead, mercury, arsenic, metal oxides (e.g., titanium dioxide, copper oxide, iron oxide, chromium oxide, etc.), mixed metal oxides (e.g., cobalt aluminum oxide, etc.), metal sulfides (e.g., zinc sulfide, cinnabar, cadmium sulfide, cerium sulfide, etc.), metal carbonates (malachite), chromates (e.g., lead chromates, etc.), molybdates, lapis lazuli, hermatite, corundum, rutile titanate, tin zinc titanate, pseudobrookite, spinel, perovskite, pyrochlores, bismuth vanadates, and mixtures thereof.

In an aspect, the first charged nanoparticle can be the same or different from the second charged nanoparticle.

The nanoparticles can be an inorganic, high refractive index, dielectric nanoparticle and/or a low refractive index, dielectric nanoparticle. Non-limiting examples of inorganic high index dielectric particles and inorganic low index particles include $SiO_2$, $TiO_2$, $Al_2O_3$, $ZrO_2$, $WO_3$, $VO_5$, ITO, $Ta_2O_5$, $CeO_2$, $Y_2O_3$, ZnS, ZnO, $In_2O_3$, $La_2O_3$, MgO, $Nd_2O_3$, $Pr_6O_{11}$, $Fe_2O_3$, $Fe_3O_4$, SiO, $SnO_2$, FeOx, $MgF_2$, $AlF_3$, $CeF_3$, $LaF_3$, LiF, $CaF_2$, TiC, TiN, cermets, diamond-like carbon, metal carbides, metal nitrides, metal borides, metal carbonitrides, metal oxycarbides, metal oxynitrides, metal oxycarbonitrides, boron carbides, and combinations of them.

In an aspect, the colorant can be an organic absorber particle or inorganic absorber particle. Non-limiting examples of organic absorber particles and inorganic absorber particles include carbon, graphite, silicon, germanium, cermets, metals mixed in a dielectric matrix, and other substances that are capable of acting as a uniform or selective absorber in the visible spectrum. Cermets and different alloys, such as Inconel, stainless steel, hastelloys, etc., can also be used for their optical and physical properties. Some metal carbides, metal nitrides, metal borides, metal carbonitrides, metal oxycarbides, metaloxynitrides, metal oxycarbonitrides can also be used for their absorbing properties.

The nanoparticles previously described can be used to produce multilayers with thin film interference proprieties affecting the pre-flake's original optical properties. Examples of multilayers based on low and high index dielectric nanoparticles are $(HL)_n$, $(LH)_n$, $(HL)_nH$, $(LH)_nL$, and combinations thereof, wherein n is an integer from about 1 to about 100, such as from about 2 to 4. The L and H layers are each a QWOT at a selected design wavelength. Other suitable designs can also be obtained by the combination of high and low dielectric coatings with different optical thicknesses, and in some designs, some layers might not have a QWOT of the same wavelength.

A method of making the pigments disclosed herein can include providing a pre-flake, providing a layer of a first charged nanoparticle to the pre-flake; rinsing; providing a layer of a second charged nanoparticle to the layer of the first charged nanoparticle, wherein the second charged nanoparticle material is oppositely charged from the first charged nanoparticle material; and rinsing; wherein a coating of nanoparticles, such as colored nanoparticles is formed on a surface of the pre-flake, wherein the nanoparticles can be present in the coating in an amount greater than about 40% by volume, for example greater than about 65% by volume. The steps of providing the layer of the first charged nanoparticle and providing the layer of the second charged nanoparticle can be repeated so that the coating of nanoparticles is a multilayer coating.

In an alternative method, the multilayer coating can be created by providing to the pre-flake alternating layers of a layer of nanoparticles and a layer of charged polymers or other molecules presenting interacting binding sites. So, a layer sequence comprises one of more materials having ionic groups of opposite charges. A simple layer sequence is ABAB(AB)n, wherein n is an integer greater than 1. Notice that even shown as different materials A and B, these two materials could be the same material where the surface was rendered of opposite charges. The multilayer coating could also use more materials. The multilayer coating can include any materials and is only dependent upon the selection of the charges for each material. In an example, the alternating layers can include a layer of charged nanoparticles, a layer of charged polymers, a layer of charged nanoparticles, etc. In another example, the alternating layers can include a layer of charged polymers, a layer of charged nanoparticles, a layer of charged polymers, etc.

The nanoparticles can be present in the coating in an amount greater than about 40% by volume, for example, greater than about 65% by volume, and as a further example, greater than about 70% by volume. In this manner, the pigment can exhibit high unique optical properties with minimal impact on overall flake thickness.

The steps of providing a layer of first charged or second charged nanoparticles can use any technologies, such as sedimentation or centrifugation processes. In these processes, the nanoparticles are allowed to sediment or are centrifuged (faster process) after the successive application of the first charged nanoparticle (A), rinsing stage, and resuspension/application of the second charged nanoparticle (B). Other process may include successive filtration using systems such as filter reactors, trickle-bed reactors, up-flow reactors, membrane reactors, and the equivalent. In another method, the pre-flakes could be forced to transit (i.e. by sprayed) to areas containing atomized solutions of first charged nanoparticle (A), rinsing media, and second charged nanoparticle (B). Alternative deposition techniques include wet coating method including dip coating, spin coating, flow coating, spray coating, roll coating, gravure coating, and a similar method.

The steps of rinsing can be performed with any solvent, such as a polar solvent or a non-polar solvent. Non-limiting examples of solvents can include water; acetates, such as ethyl acetate, propyl acetate, and butyl acetate; acetone; ketones, such as dimethyl ketone (DMK), methylethyl ketone (MEK), secbutyl methyl ketone (SBMK), ter-butyl methyl ketone (TBMK), cyclopenthanon, and anisole; glycol and glycol derivatives, such as propylene glycol methyl ether, and propylene glycol methyl ether acetate; alcohols, such as isopropyl alcohol, and diacetone alcohol; esters, such as malonates; heterocyclic solvents, such as n-methyl pyrrolidone; hydrocarbons, such as toluene, and xylene; coalescing solvents, such as glycol ethers; and mixtures thereof.

The method can further include a step of providing a first protecting layer to the surface of the pre-flake prior to providing a coating of nanoparticles. The first protecting layer can inhibit oxidation of the pre-flake when it is exposed to the coating of nanoparticles. The first protecting layer can include a sol-gel layer or a polymeric layer, for example. In an aspect, the method of making a pigment can include providing a pre-flake; providing a layer of a first charged nanoparticle to the pre-flake; rinsing; providing a layer of charged polymer (polyelectrolytes) or other molecules presenting interacting binding sites; rinsing; providing a layer of a second charged nanoparticle to the layer of the charged polymer (polyelectrolytes) or other molecules presenting interacting binding sites; and rinsing.

The method can further include a step of providing a second protecting layer to a top-most layer of the coating of nanoparticles. The second protecting layer can include a layer of charged polymers (polyelectrolytes) or other organic molecules presenting interacting binding sites or a sol-gel layer. In an aspect, a second protecting layer of charged polymers (polyelectrolytes) or other organic molecules presenting interacting binding sites can provide a functionalized outer surface with tunable properties such as hydrophilicity, hydrophobicity, lipophilicity, permeability, hardness, stiffness, to mention a few to the pigment.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a coating and its many aspects, features and elements. Such a device can be dynamic in its use and operation, this disclosure is intended to encompass the equivalents, means, systems and methods of the use of the device and/or optical device of manufacture and its many aspects consistent with the description and spirit of the operations and functions disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. A pigment, comprising:
   a pre-flake; and
   a coating of colored nanoparticles present on a surface of the pre-flake, the colored nanoparticles including at least one colorant chosen from dyes, organic pigments and inorganic pigments, the inorganic pigments being chosen from lead; mercury; arsenic; metal oxides chosen from titanium dioxide, copper oxide, iron oxide and chromium oxide; mixed metal oxides; metal sulfides; metal carbonates; chromates; molybdates; lapis lazuli; hermatite; corundum; rutile titanate; tin zinc titanate; pseudobrookite; spinel; perovskite; pyrochlores; bismuth vanadates; and mixtures thereof, wherein the colored nanoparticles are present in the coating in an amount greater than about 40% by volume.

2. The pigment of claim 1, wherein the pre-flake has a thickness ranging from about 10 nm to about 3 microns.

3. The pigment of claim 1, wherein the pre-flake has an average particle size ranging from about 3 microns to about 100 microns.

4. The pigment of claim 1, wherein the pre-flake includes a material chosen from transparent materials, semi-transparent materials, and reflective opaque materials.

5. The pigment of claim 1, wherein the pre-flake includes a material chosen from glass, silica, titania, alumina, natural mica, synthetic mica, and bismuth oxychloride.

6. The pigment of claim 1, wherein the pre-flake is a metal, a non-metal, or a metal alloy.

7. The pigment of claim 1, wherein the pre-flake includes a material chosen from silicon, germanium, and molybdenum.

8. The pigment of claim 1, wherein the colorant is a dye.

9. The pigment of claim 1, wherein the colorant includes at least one pigment.

10. The pigment of claim 1, wherein the nanoparticles have an average particle size of less than about 700 nm.

11. The pigment of claim 1, wherein the coating has a thickness ranging from about 20 nm to about 2 microns.

12. The pigment of claim 1, wherein the coating is on at least one surface of the pre-flake.

13. The pigment of claim 1, wherein the coating is on all surfaces of the pre-flake.

14. The pigment of claim 1, wherein the nanoparticles are chemically modified to provide acid-base interaction.

15. The pigment of claim 1, wherein the pre-flake provides a diffractive effect.

16. The pigment of claim 6, wherein the pre-flake has a magnetic property.

17. The pigment of claim 1, wherein the colorant is an organic pigment.

18. A pigment, comprising:
    a pre-flake; and
    a coating of nanoparticles present on a surface of the pre-flake, the coating comprising multiple layers of nanoparticles, wherein the nanoparticles are present in the coating in an amount greater than about 40% by volume,
    wherein the multiple layers of nanoparticles comprise a high index layer including first nanoparticles and a low index layer including second nanoparticles, the first nanoparticles being inorganic high index dielectric particles and the second nanoparticles being inorganic low index dielectric particles.

* * * * *